Patented Apr. 30, 1940

2,198,914

UNITED STATES PATENT OFFICE 2,198,914

TREATMENT OF MATERIALS CONTAINING TANTALUM AND NIOBIUM

Joseph Pierre Leemans, Hoboken-lez-Anvers, Belgium, assignor to Société Générale Métallurgique de Hoboken, Hoboken-lez-Anvers, Belgium, a Belgian limited company No Drawing. Original application January 27, 1938, Serial No. 187,245. Divided and this application April 7, 1939, Serial No. 266,536. In Great Britain March 19, 1937

1 Claim. (Cl. 75—10)

This application is a division of my application Serial No. 187,245 filed Jan. 27, 1938.

This invention relates to an improved process for the recovery of tantalum and niobium from their ores, or from metallurgical by-products such as those in which the said elements are found in the form of oxide compounds, free or combined.

This invention has for its object the recovery by an economical process of tantalum and niobium in the form of metals or of alloys.

The present invention consists in the combination of a reducing operation of the primary material by means of one or several of the metals aluminium, calcium, magnesium, with a subsequent reducing operation in an electric furnace of the slag obtained from the first said reducing operation, so as to obtain on the one hand a tantalum and niobium alloy and on the other hand a slag poor in tantalum and niobium.

The first reducing operation in the presence of one or more of the metals Al, Ca, Mg is carried out without other external heat than that required for starting the reaction. In this way a slag comparatively rich in Ta and Nb is obtained. The said first reducing operation is carried out in the presence of the metals with which it is desired to alloy the tantalum and niobium, for instance with iron. If the said metal is not present in a sufficient amount in the primary material, it is added in the metal or oxide form, so as to obtain the required tantalum and niobium alloy, for instance ferro-tantalum and ferro-niobium.

The second reducing operation, of the slag comparatively rich in Ta and Nb in an electric furnace, may be carried out in the presence of reducing agents, such as Ca, Al, Mg used either separately, or together, or by two.

According to another feature of the present invention, the primary material is subjected to a selective reducing operation in the presence of alloys of Nb and/or Ta or of ferro-tantalum and/or ferro-niobium with one of several of the following reducing metals: Ca, Al, Mg.

In this way it is possible to concentrate the Ta in a product poor in Nb; this product may serve as the primary material for the manufacture of commercial tantaliferous products.

This feature of the process may be carried out as follows:

A ferro-tantalum and ferro-niobium containing one or several of the metals Ca, Al, Mg is melted in an electric furnace, of the Héroult type for instance, in the presence of the primary material containing oxides of Ta and/or Nb, with the addition of a flux such as CaO, $SiO_2$, fluorspar, etc. A slag is thus formed which acts upon the reducing metals of the ferro-Ta/Nb. The niobium is reduced and passes into an alloy, whilst the oxides of the reducing metals pass into the slag. The slag is tapped as soon as it is exhausted or sufficiently poor in Nb.

A second slag containing the oxides of Ta+Nb is then produced from the ferro-Ta+Nb and tapped after being deprived substantially of its Nb. This operation is continued as long as there is a sufficient amount of reducing metals left in the ferro-Ta+Nb.

According to another feature of the invention, the primary material is subjected to a reducing operation with one or more of the elements Al, Ca, Mg, alloyed or combined with one or more metals as characterized below, in order to substantially separate the whole or the major part of the niobium or tantalum when one alone of said elements is present, or the niobium and tantalum together, when both are present, in the form of alloy.

The metals which are added to the reducing agents are such metals whose alloying or combination reaction with the aforesaid reducing agents develops heat so that the metallothermic power of a given quantity of these reducing elements is smaller in the obtained alloy or combination than the same quantity in the elementary state. Among these metals, nickel, cobalt, iron, are more particularly contemplated.

The raw material containing the tantalum and/or niobium may be subjected inside any suitable metallurgical apparatus, for instance in an electric furnace, to a reducing operation, with one or more of the elements Al, Ca, Mg, alloyed or combined to nickel and/or cobalt and/or iron.

In this way it is possible to obtain:

1—an alloy containing the major part of the reduced tantalum and/or niobium alloyed to the metal which has been used for reducing the thermal activity of the reducing agent, that is in the particular case alloyed to one or several of the elements nickel, cobalt, iron;

2—a slag rich in tantalum and/or niobium, which may be treated by any known process for the recovery of tantalum and/or niobium.

According to another feature of the invention, the primary material is subjected to a selective reduction in the presence of one or several of the following reducing elements: Ca, Al, Mg, alloyed or combined with one or more metals as characterized below, so as to obtain a product (alloy for instance) in which the ratio Nb/Ta is higher than that of the primary material.

The metals which are added to the reducing agents are such metals whose alloying or combination reaction with the aforesaid reducing agents develops heat so that the metallothermic power of a given quantity of these reducing elements is smaller in the obtained alloy or combination than the same quantity in the elementary state. Among these metals, nickel, cobalt, iron, are more particularly contemplated.

For carrying this feature of the invention into effect, the primary material containing tantalum and niobium may be subjected inside a suitable metallurgical apparatus, such as an electric furnace, to a selective reduction in the presence of one or more of the elements Ca, Al, Mg, the thermic capacity of which has been diminished by alloying or combining them to other metals such as Ni, Co, Fe. The amount of reducing agent may be so calculated that the major part of the Nb contained by the primary material is reduced and passes into an alloy in which the ratio Nb/Ta is higher than that of the primary material. The other component elements of the alloy are the metal or metals used for lowering the thermic capacity of the reducing agent.

By the process according to the present invention, an alloy is obtained in which the ratio Nb/Ta is higher than that of the primary material, and also a slag is obtained in which the ratio Ta/Nb is higher than that of the primary material. The slag may be treated by any suitable known process with a view to recovering the tantalum and niobium.

I claim:

A process for the treatment of primary materials containing the metals tantalum and niobium in oxide form and another metal, such as iron, with a view to recovering separately an alloy rich in niobium and poor in silicon and carbon, and an alloy rich in tantalum and poor in silicon, comprising the steps of subjecting the primary material first to a reducing operation without external heat other than that required for starting the reaction and by means of an amount of reducing agent consisting of at least one of the metals Al, Ca, Mg, which amount is sufficiently small to produce an alloy rich in niobium and a slag comparatively rich in tantalum and niobium, separating the alloy rich in niobium from the slag thus produced and subjecting the slag to a reducing operation inside an electric furnace in the presence of at least one of the metals Al, Ca, Mg, to produce an alloy rich in tantalum and a second slag, and separating the alloy rich in tantalum from the second slag, as and for the purpose set forth.

JOSEPH PIERRE LEEMANS.